Aug. 4, 1959   A. G. ENOCK ET AL   2,897,988
CRATING AND DECRATING OF BOTTLES
Filed April 23, 1954   8 Sheets-Sheet 2

Aug. 4, 1959     A. G. ENOCK ET AL     2,897,988
CRATING AND DECRATING OF BOTTLES
Filed April 23, 1954                        8 Sheets-Sheet 3

Inventors
Arthur G. Enock
Henry W. Longville,
by Hall & Houghton
Attorney.

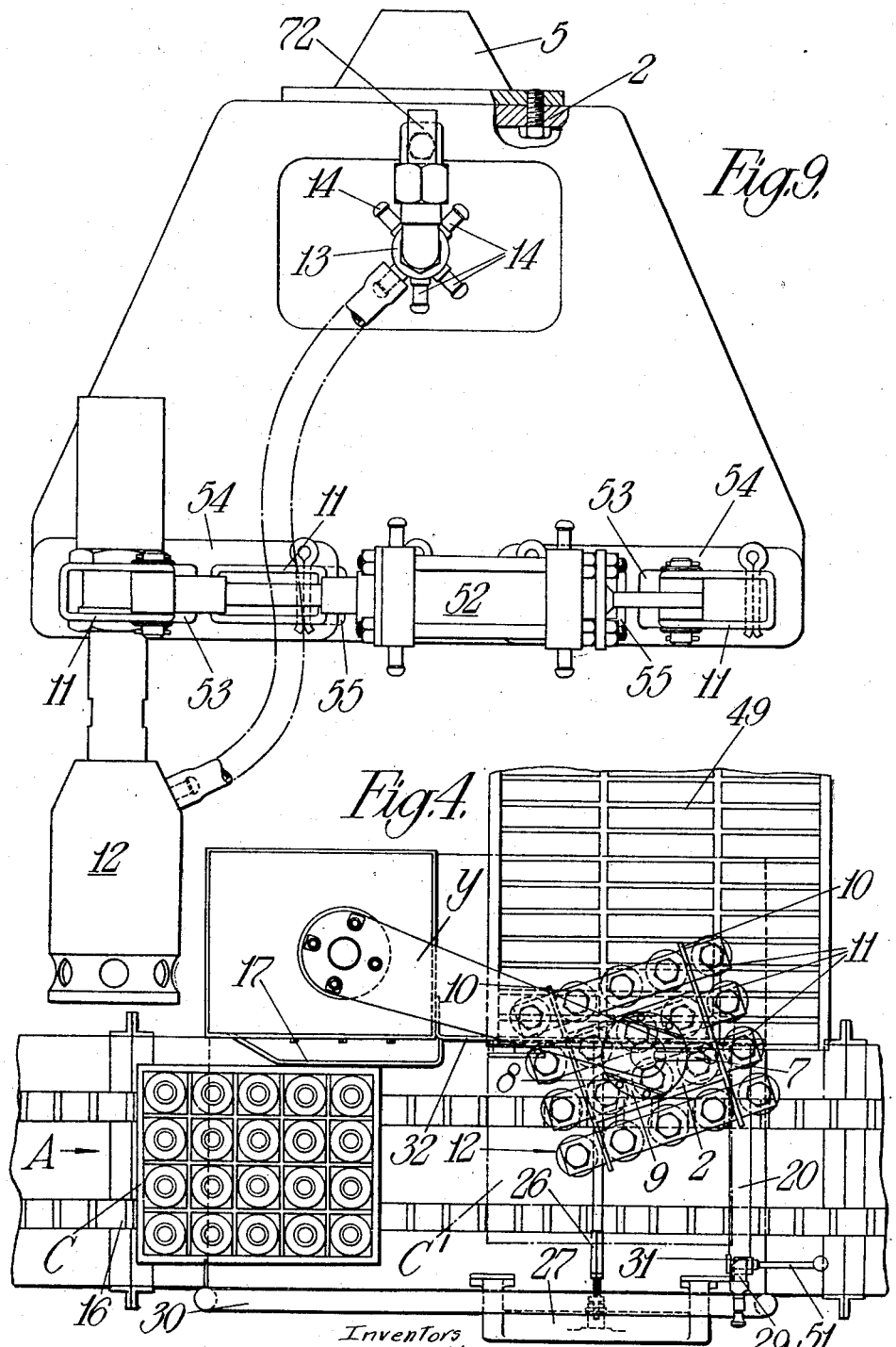

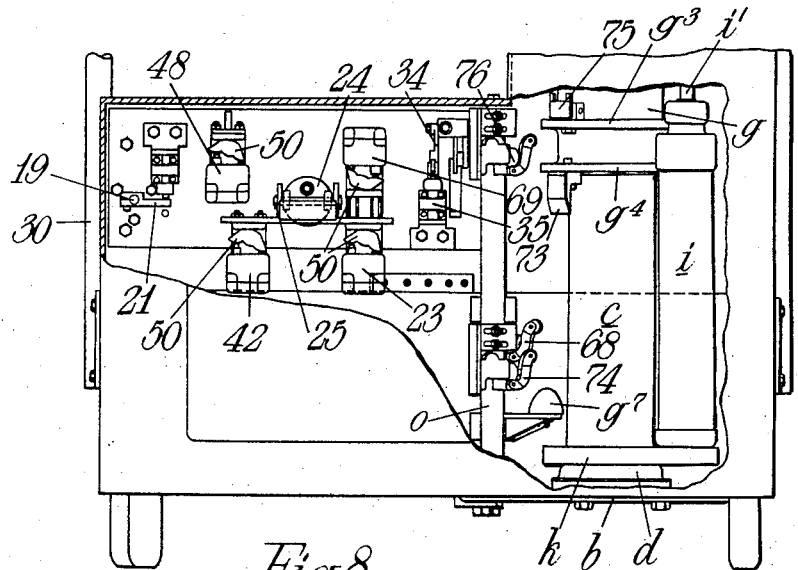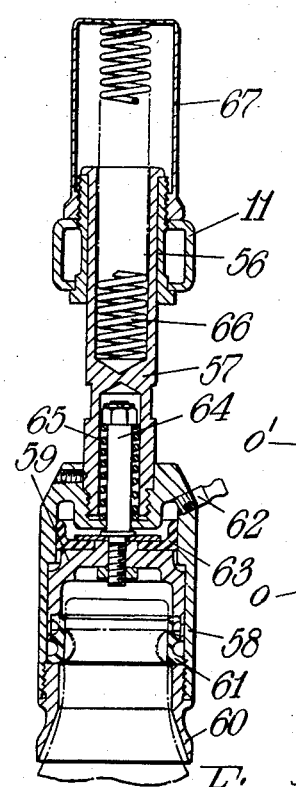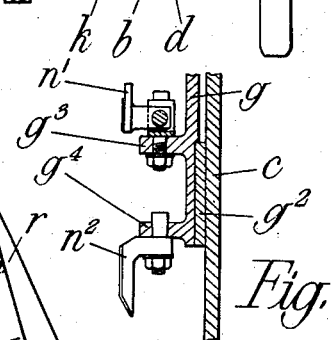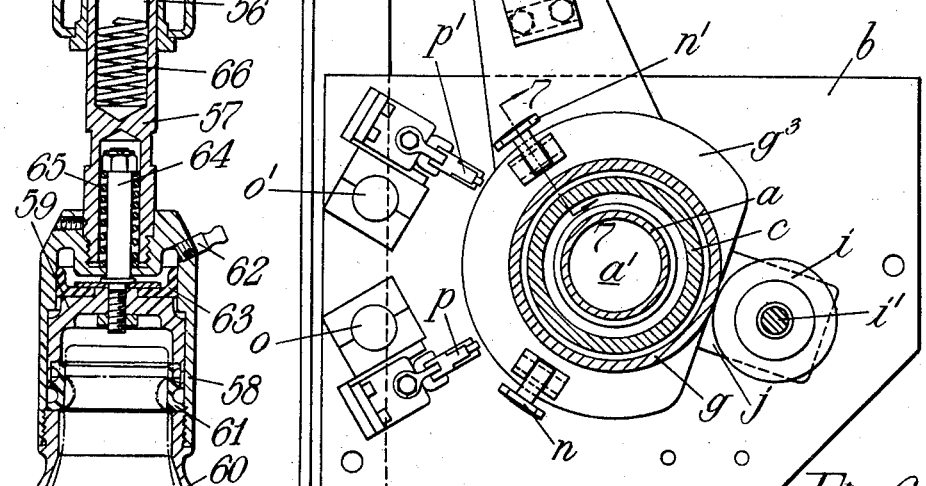

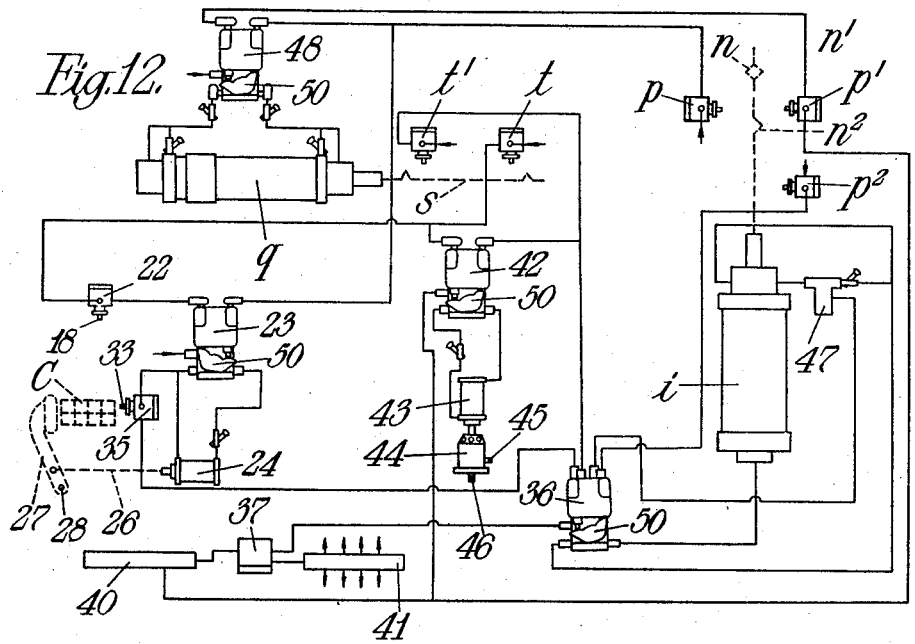
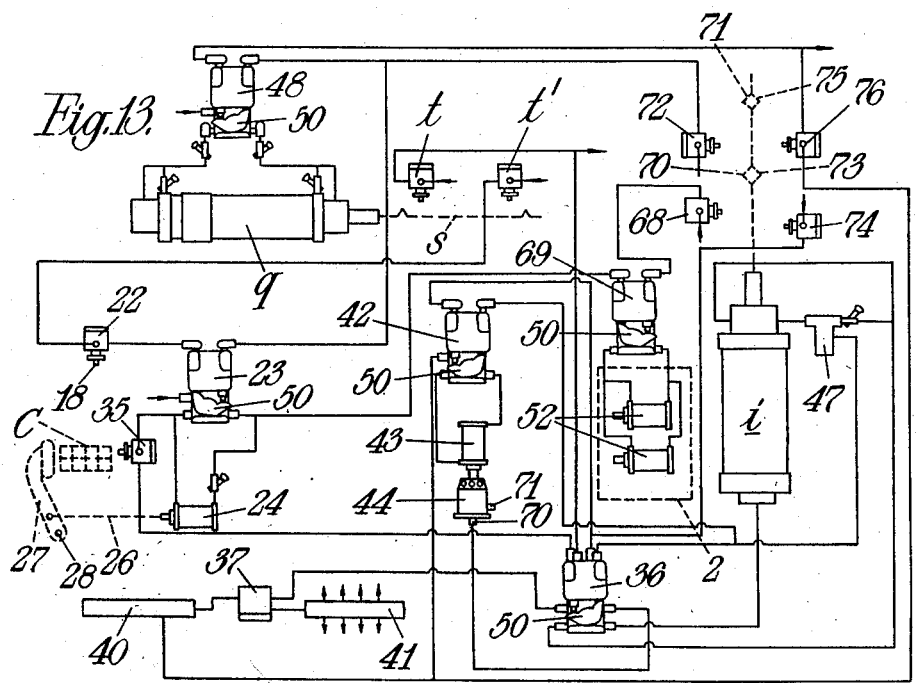

Aug. 4, 1959     A. G. ENOCK ET AL     2,897,988
CRATING AND DECRATING OF BOTTLES
Filed April 23, 1954     8 Sheets-Sheet 8

INVENTORS,
ARTHUR G. ENOCK & HENRY W. LONGVILLE,
by Hall & Houghton
Attorney.

United States Patent Office 2,897,988
Patented Aug. 4, 1959

2,897,988

CRATING AND DECRATING OF BOTTLES

Arthur Graham Enock and Henry William Longville, London, England, assignors to Graham-Enock Manufacturing Company Limited, London, England Application April 23, 1954, Serial No. 425,188

Claims priority, application Great Britain March 8, 1954

5 Claims. (Cl. 214—309)

This invention relates to the crating and decrating of bottles or other containers, such for example as in the case of milk bottles in which the empty bottles are mechanically unloaded from crates for delivery to bottle washing machinery, and filled bottles are mechanically loaded in a crate, the mechanism being operated to deal with a full complement of bottles at each operation. Said crating and decrating operations are hereafter referred to in the description and claims by the generic term "handling."

The object of the invention is to provide improvements in bottle handling apparatus.

It is a further object to provide bottle handling apparatus which is particularly applicable to the bottle handling plant described in our British patent application No. 6,942/54.

According to the invention apparatus for handling bottles or other containers comprises a crate conveyor, bottle transfer means which is vertically reciprocable and also oscillatable about a vertical axis in order to transport the bottles between bottle pick-up and discharge positions, a pressure fluid circuit comprising pressure fluid operated crate clamping means and pressure fluid operated means for vertically reciprocating the bottle transfer means, and control valves in said circuit controlling operation of the crate clamping means and the means for vertically reciprocating the bottle transfer means, the operation of said pressure fluid operated means being initiated by a crate when the latter moves into a predetermined position upon the conveyor, said crate first operating the valve controlling operation of the crate clamping means and then operating the valve controlling the means for vertically reciprocating the bottle transfer means.

The transfer arm may be oscillated and vertically reciprocated in sequence by pressure fluid operated means operating in a compressed air or other pressure fluid circuit, the operation of said means being initiated by a crate when the latter is moved into a predetermined position for the removal or insertion of bottles or containers.

Further, a bottle handling machine constructed in accordance with the invention may have a base portion of box-like form and a columnar portion extending vertically upwards from the base and through which passes the bottle transfer means, said columnar portion being positioned to one side of the base to permit the passage over the latter of a crate conveyor. Such a construction permits a trip member to be poistioned in the path of movement of a crate upon the conveyor such that the crate can move the trip member to operate valve means controlling flow of pressure fluid to operate a crate clamping member, and also initiate operation of the means in the compressed air or other fluid circuit referred to above.

The bottle gripping means on the lifting head may be adjustable to vary the row spacing in one direction whereby the head will accept a complement of said bottles or containers which are in close-up formation, and space the rows to conform to the spacing in the crate.

In the accompanying drawings which illustrate by way of example bottle handling apparatus constructed according to the invention:

Figure 4 is a plan view of the machine;

Figure 3:
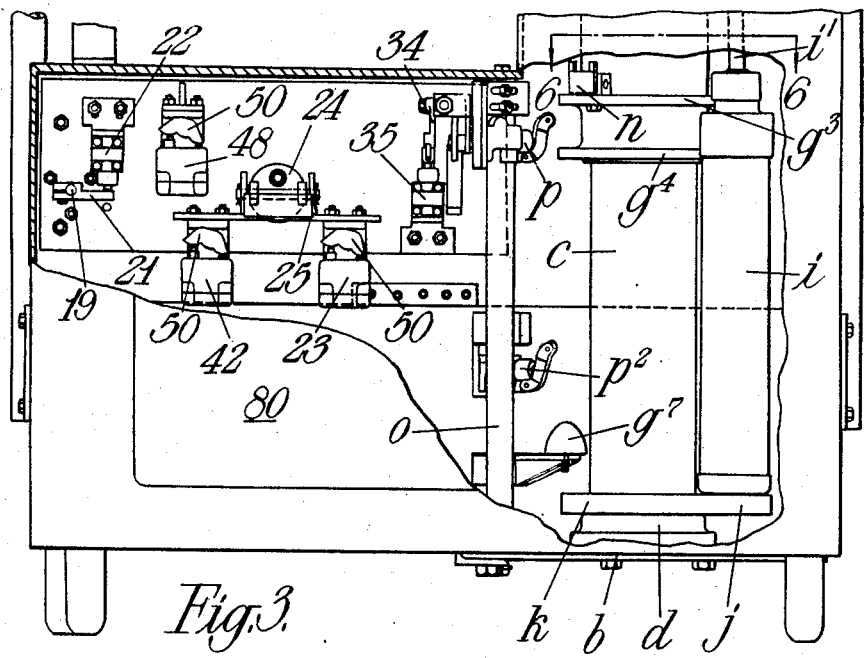
Figure 3 is a part sectional rear view of the lower half of the machine of Figure 1.
Figure 10:
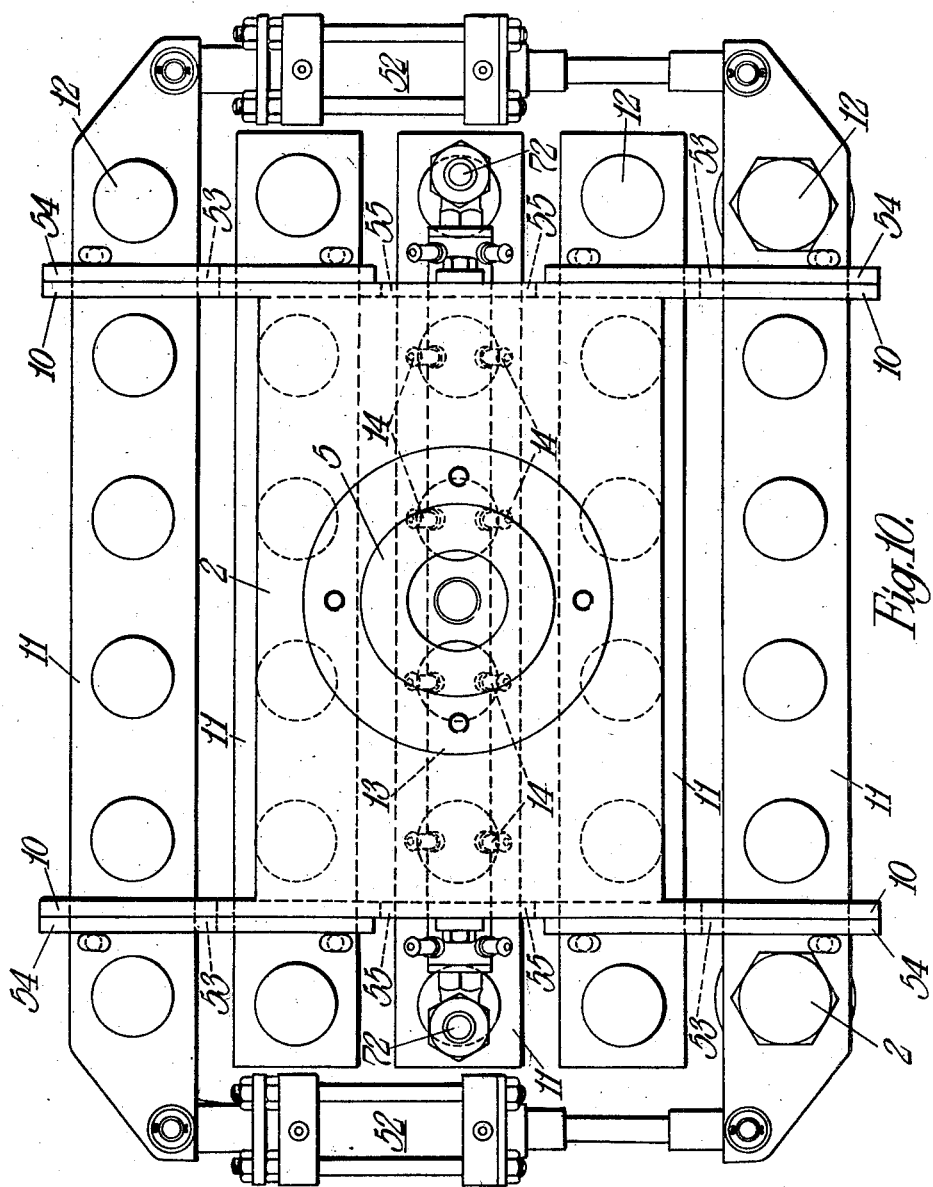

Figures 6 and 7 are detail views of striker mechanism for operating pilot valves in a compressed air operating circuit for the machine, Figure 6 being a section on line 6—6 of Figure 3, and Figure 7 a section on line 7—7 of Figure 6;

Figure 8 is a part sectional rear view similar to Figure 3, but of a bottle recrating machine;

Figures 9 and 10 are detail views of a lifting head suitable for a bottle recrating machine, Figure 9 being a side elevation and Figure 10 a plan;

Figure 11 is a detail sectional view of a compressed air operated type of bottle grip or nozzle carried by the bottle lifting head of Figures 9 and 10;

Figure 12 is a compressed air operating circuit diagram for the sequence of operations of the elements of a bottle decrating machine, whilst Figure 13 is a similar diagram for a bottle recrating machine.

Figure 14:
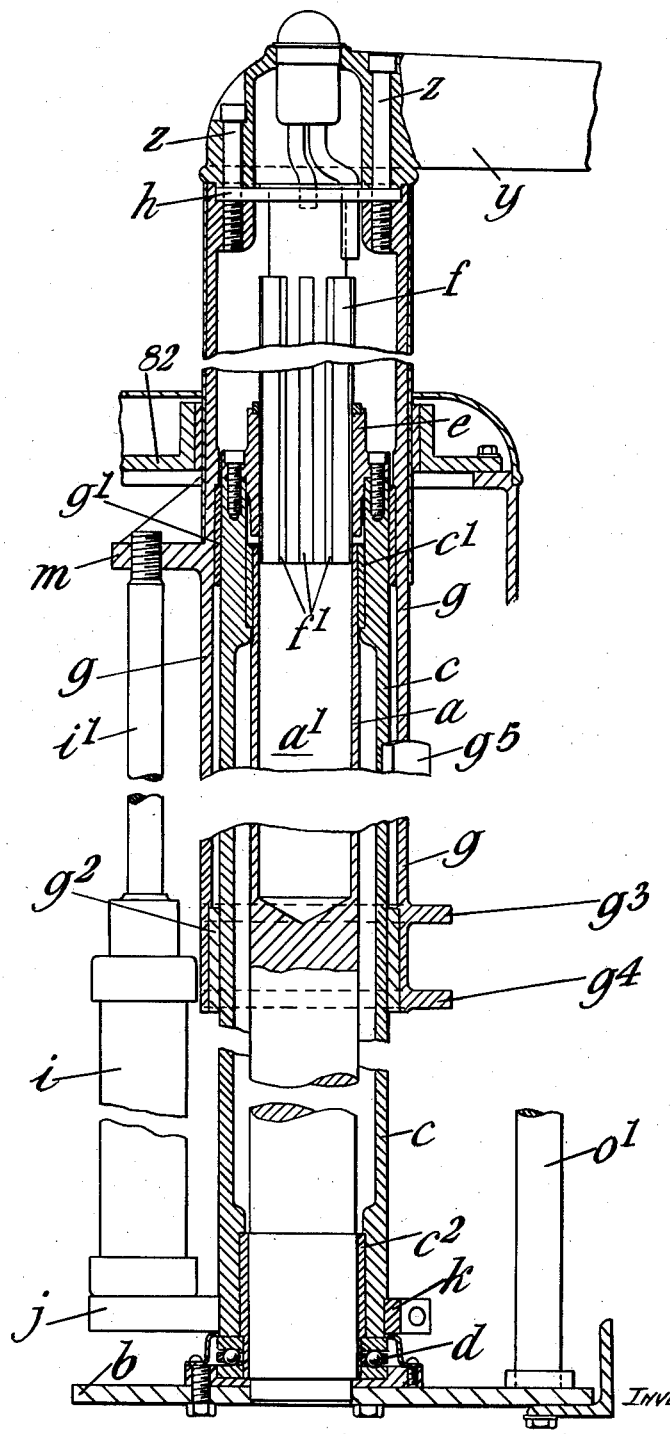

Fig. 14 is a detail sectional view to be referred to later.

The apparatus as illustrated by the above drawings is suitable for a bottle handling plant as disclosed in the specification of our said British application No. 6,942/54, and the decrating machine shown particularly in Figures 1 to 5 has a stationary bearing column $a$ which is mounted upon a base plate $b$ and extends upwardly therefrom with its axis vertical.

Surrounding the bearing column is an oscillating sleeve $c$ provided at its upper and lower ends with bearing bushes $c'$, $c^2$ engaging column $a$. At its lower end the oscillating sleeve is supported by a thrust bearing $d$ carried by the base plate $b$. Secured on the upper end of the oscillating sleeve is a flanged driving sleeve $e$, the inner surface of which is shaped to provide a series of splines or keys which are adapted to engage complementary grooves or keyways $f'$ in a shaft $f$ which is axially displaceable in the driving sleeve. In order to accommodate the shaft $f$ in its axial displacement the bearing column $a$ has a bore $a'$ extending for a suitable length in the upper half of the column.

A lifting column $g$ in the form of a sleeve surrounds the oscillating sleeve $c$ and is provided with spaced bearing bushes $g'$, $g^2$ engaging the oscillating sleeve. At its upper end the lifting column $g$ is secured to the shaft $f$ by means of a securing disc $h$ carried by the shaft, and by this means the lifting column receives the oscillatory movements of sleeve $c$. The construction and arrangement of the bearing and lifting columns $a$ and $g$ respectively, and the oscillating sleeve $c$ are more clearly shown in Fig. 14.

The lifting column $g$ is adapted to be axially reciprocated relatively to the oscillating sleeve $c$ by means of an air cylinder $i$ located with its axis vertical. Such air cylinder is supported upon a lug $j$ extending radially from a collar member $k$ surrounding the lower end of the oscillating sleeve $c$. The collar member $k$ is radially split and is bolted on the sleeve to grip the latter as shown clearly in Figure 5. The piston of the air cylinder $i$ has its piston rod $i'$ secured to a radial lug $m$ on the lifting column $g$ in order that the latter may receive its reciprocatory movements. As will be explained later with respect to Figure 8 compressed air is supplied to air cylinder $i$ for periodically raising and lowering lifting column $g$.

Adjacent its lower end the lifting column is provided with a pair of axially spaced flanges $g^3$, $g^4$ which carry striker mechanism shown particularly in Figures 6 and 7 for operating pilot valves in the compressed air operating circuit of the machine. Flange $g^3$ carries strikers $n$ and $n'$ which are pivotally mounted on the flange such that they operate only on the upward movement of volumn $g$. Flange $g^4$ carries the rigid striker $n^2$. The pilot valves operated by the strikers are mounted on supporting posts $o$, $o'$ carried by the base plate $b$, post $o$ carrying pilot valve $p$ and post $o'$ pilot valves $p'$ and $p^2$. The strikers $n$, $n'$ and $n^2$ are positioned upon flanges $g^3$ and $g^4$ such that during the reciprocatory and oscillatory movements of column $g$ they will operate in correct sequence the appropriate pilot valves $p$, $p'$ and $p^2$.

The lifting column $g$ is guided in its upward and downward movements by a cam $g^5$ which engages a roller $g^6$ secured upon the machine casing, the cam clearing the roller at the upper limit of movement of column $g$ in order to permit the oscillatory movements of column $g$ received from sleeve $c$. At its lower limit of movement the column $g$ contacts a resilient buffer member $g^7$ which arrests and after a time brings to a stop the downward movement of the column $g$. As shown the buffer $g^7$ is of rubber and is carried from post $o'$.

The oscillating movements of the oscillating sleeve $c$ are effected by a traversing air cylinder $q$ the piston of which has its piston rod $q'$ connected to an arm $r$ radially extending from and formed in one with the collar member $k$ secured on the oscillating sleeve $c$. To permit the oscillatory turning movements of the arm $r$ about the vertical axis of column $a$ the piston rod $q'$ has a swivel connection at $r'$ with the arm $r$, whilst the outer end of the air cylinder $q$ has a swivel mounting in a bearing member $q^2$ mounted on the main casing of the machine. Sequential control of compressed air to cylinder $q$, to be explained later with respect to Figure 8, is by a striker cam $s$ actuating pilot valves $t$ and $t'$ carried by the air cylinder $q$, and in the compressed air operating circuit of the machine. The cam $s$ is slidable upon rods $u$ carried by brackets $v$ from air cylinder $q$, and is operable along the rods by a rod $w$ connected at one end by a bracket $x$ to the swivel connection $r'$ oscillatory arm $r$. Stops $r^2$ secured upon base $b$ are contacted by lug $j$ and thus limit the oscillatory movements of arm $r$, such movements being damped by a shock absorber indicated at $r^3$ which may be of a torsional spring or other suitable type and which is connected to arm $r$ by links $r^4$.

To the upper end of the lifting column $g$ a radial transfer arm $y$ is rigidly secured by screws $z$ passing through disc $h$ and screwing into lugs at the top of column $g$. To the outer end of the arm a bottle lifting head 2 is attached to depend downwardly therefrom.

The end of the transfer arm $y$ is downwardly splayed to provide a horizontal seat for a washer element 3 which is formed with a central spigot 4 which enters a recess in the splayed end of the arm and has a coned aperture to provide a seating for a complementary coned element 5 secured on the head 2. The coned element is fixed to the arm by a central screw 6 which screws into element 5, passes through the splayed end of arm $y$ and terminates with an operating handle 7. The splayed end of the arm is formed with diametrically opposed flat surfaces 8 engaged by plates 9 secured on the head 2 in order to position the latter relatively to the arm $y$. By the above construction the bottle lifting head 2 is detachably secured to the arm so that the appropriate head may be positioned thereon according to the size of bottle being dealt with.

The bottle lifting head 2 includes side plates 10 for supporting a series of, in the example being described, four hollow bars 11 each of rectangular shape in cross-section. Each of the hollow bars carries a number of, as shown five, bottle gripping or holding members 12, equally spaced from each other along the bar. As shown the lifting head carries a total of 20 bottles, but it will be appreciated that with a different size of bottle this may vary and so also the number of bars 11 and/or the number of gripping members 12 on each bar.

Any suitable type of bottle gripper or holding means may be employed for the members 12, such for example as the mechanical type of bottle gripper described in the specification of British Patent No. 707,876 filed by A. G. Enock, or the compressed air operated type of gripper to be later described with respect to Figures 9, 10 and 11. Or again the members 12 may be of the vacuum lift type operating for example such as described in British patent specification No. 680,454. In the decrating machine now being described with reference to Figures 1 to 7 and 12 the gripping members 12 are presumed to be of the vacuum lift type, whilst in the recrating machine to be described later with respect to Figures 8 to 11 and 13 the gripping members 12 are of the compressed air operated type. It may be mentioned here that in recrating filled and capped bottles the vacuum lift type of gripper 12 may not be suitable owing to possible damage to the bottle cap by the inrush of air on release of vacuum.

Figure 1:
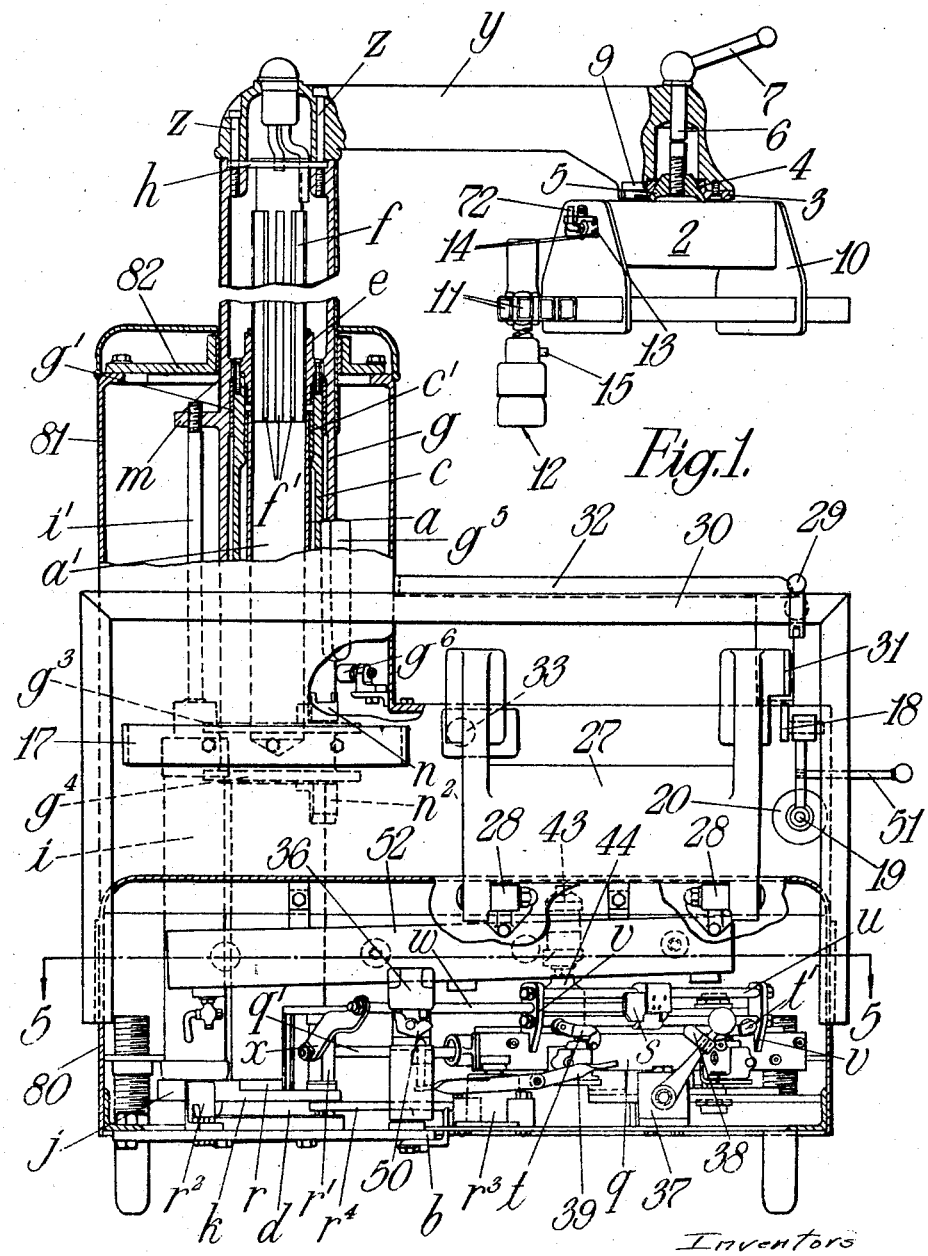
Figure 1 is a part sectional front view of a bottle decrating machine.
Figure 2:
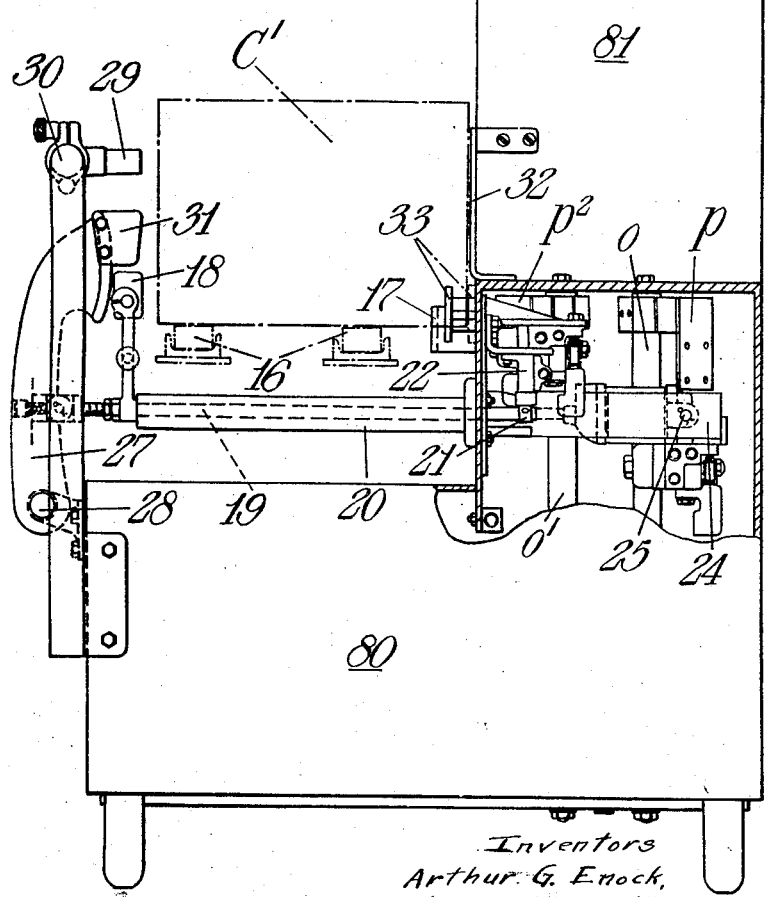
Figure 2 is a part sectional side view of the machine looking from right to left of Figure 1.

Carried by the lifting head 2 is a manifold 13 connected in a vacuum pump circuit to be referred to later with reference to Figure 12. For the bottle gripping head shown in Figures 1, 2 and 4 the manifold 13 will have spaced along its length five groups of nipples, each group consisting of four nipples 14, as shown in Figures 1 and 2. Each of the nipples 14 is connected to an inlet 15 on each of the nozzles 12 which are arranged in five groups of four nozzles in a group on the bars 11 as shown clearly in Figure 4. With this arrangement all the nozzles 12 can be subjected to vacuum for securing bottles in the nozzles and lifting and transferring them.

In Figures 2 and 4 there is indicated diagrammatically at 16 a crate conveyor which feeds the crates to be emptied to the decrating machine in the direction indicated by arrow A in Figure 4, C indicating a crate as it has just entered the machine and guided by guide 17. As the conveyor carries the crate further into the machine the crate contacts a trip plate 18 carried by an arm secured to a shaft 19. The latter passes through a supporting sleeve 20 projecting from the machine casing and carries at its inner end an arm 21 operating when turned to open a pilot valve 22 in the compressed air operating circuit which also contains a crate clamp valve 23 and a crate clamp operating cylinder and piston 24 pivotally mounted at 25 within the machine casing. The piston of the clamp operating cylinder 24 has its piston rod 26 pivotally connected to a crate clamping member 27 pivoted at 28 to the machine casing. A stop 29 adjustably positioned upon a crate guiding rail 30 of the machine and a stop 31 upon clamp 27 prevent further movement of the crate by the conveyor, after it has operated trip plate 18, until release of the clamp from the crate.

Operation of clamp 27 pushes the crate sideways to a position indicated at C' in Figure 4 in which it is clamped against rail 32 and also depresses a spring returned contact member 33. The latter is connected through lever 34 (Figure 3) to a pilot valve 35 in the compressed air operating circuit, which also includes a lift valve 36 and the aforementioned air cylinder $i$ operating lifting column $g$. Thus compressing of contact member 33 by the crate will initiate operation of lifting column $g$.

Figure 5:
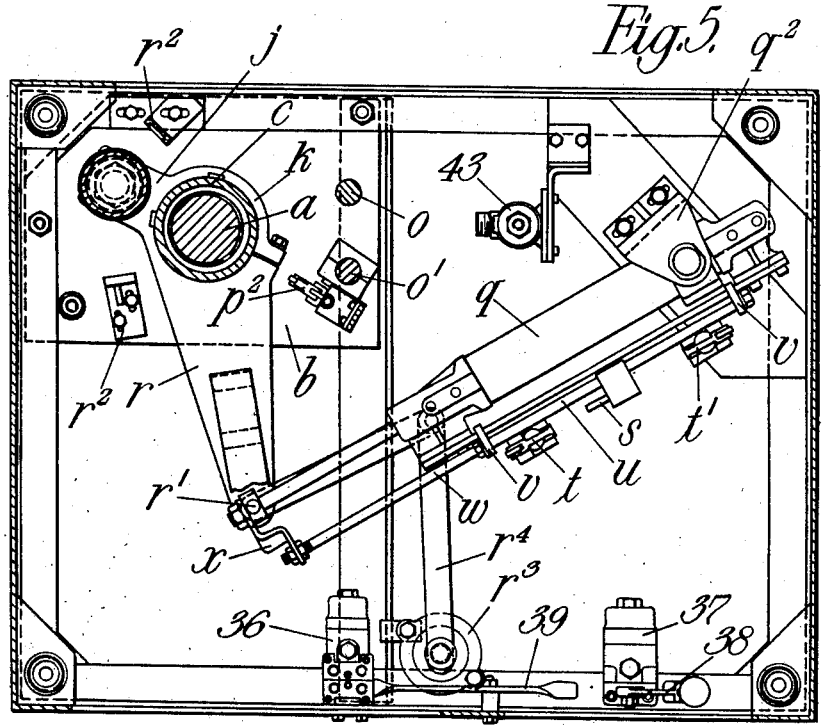
Figure 5 is a sectional plan on the line 5—5 of Figure 1.

In Figures 1 and 5 there is indicated a hand operated stop-start valve 37 which is in the compressed air operating circuit, and when operated to start the machine conditions the latter for subsequent full automatic operation. On the handle of valve 37 there is secured a finger member 38 which, when the valve is operated on emergency to the "off" position, will strike one end of a pivoted lever 39, the other end of which will operate lift valve 36 and cause lifting column g always to return to its raised position in which arm y and head 2 are clear of crates upon the conveyor.

Reference will now be made particularly to the compressed air operating circuit diagram of Figure 12 for describing the operation of the machine. In Figure 12 reference 40 indicates an air chamber receiving compressed air from a suitable source of supply and feeding it to the circuit. An air distributor indicated at 41 receives air via valve 37 and distributes it to various controlling valves in the circuit as indicated by arrow heads leading to such valves. For the sake of clearness in Figures 1 to 5 the arm y is shown in a position intermediate the limits of its traversing path, but assuming the arm to be moved to a position such that the bottle lifting head 2 is over the crate conveyor 16, the cam s will then operate pilot valve t and release compressed air from the distributor 41 to operate a two-way bottle grip valve 42. Compressed air from air chamber 40 will then be directed through valve 42 to a cylinder 43 containing a piston which will be moved in a direction to open a valve 44. The latter is connected at 45 to the manifold 13 carried by lifting head 2, and also connected at 46 to any suitable form of vacuum pump (not shown). Thus opening of valve 44 will cause the gripping nozzles 12 to be subjected to suction via the manifold 13.

Operation of valve t by cam s will also cause compressed air to pass to pilot valve 22 and when a crate carried by conveyor 16 contacts trip plate 18 and turns shaft 19 the valve 22 will be opened to pass compressed air to clamp valve 23. The latter will thus be opened to permit air from distributor 41 to act on the piston of cylinder 24 which will through piston rod 26 pull on clamp 27 to clamp the crate against rail 32. On being clamped the crate will depress contact member 33 and open pilot valve 35 to permit compressed air to pass to lift valve 36 which will thereby be operated such that compressed air can pass through the lift valve to the top of the air cylinder i. The piston of the latter will thus descend and in doing so lower the lifting column g together with the traverse arm y and bottle lifting head 2. As column g descends striker n will pivot and thereby not operate pilot valve p as it moves over the latter.

When the column g approaches the end of its downward movement the nozzles 12 on lifting head 2 engage and hold firmly by suction the bottles in the clamped crate and at the same time the flange $g^4$ on column g will contact the rubber stop $g^7$ and cushion the final downward movement of the column. During this final downward movement there will be a time lag resulting in a build-up of pressure in the compressed air line connecting air cylinder i with a spring loaded valve 47. The latter is adjustable to open at a predetermined pressure somewhat above the normal pressure in the compressed air circuit and on the pressure build-up reaching this limit valve 47 will open to pass compressed air to lift valve 36 in a direction to reverse the latter. Compressed air will then be passed via valve 36 to the bottom of air cylinder i which will thus cause the raising of column g and the lifting of the bottles out of the crate.

Continued upward movement of column g will eventually result in striker n operating pilot valve p and thus permitting compressed air to pass to clamp valve 23. The latter is thereby reversed such that compressed air from the distributor will pass to the clamp cylinder 24 in a direction in which the piston will open clamp 27 and release the crate for continuation of its journey on the conveyor 16 to a crate loading or other desired station. Contact member 33 will then be returned by its spring to its outward position for subsequent operation by the next crate.

Operation of pilot valve p will also permit compressed air to operate a traversing valve 48 which will then pass air from distributor 41 to one end of the traversing cylinder q. Arm r will thus be turned and through sleeve C, shaft f and column g the traversing arm y will be moved from above the crate conveyor 16 to a position in which the lifting head 2 carrying the bottles is in position over a receiving conveyor indicated diagrammatically at 49 in Figure 4.

At the end of the traversing movement of arm r, cam s will operate pilot valve t' and release compressed air from distributor 41 to reverse lift valve 36. Reversal of lift valve 36 causes air to be passed to air cylinder i such that column g will descend together with arm y and the lifting head with its bottles. During descent of column g compressed air will also be passed via valve t' to reverse bottle grip valve 42, resulting in operation of the piston in cylinder 43 to close valve 44. Thus suction from the vacuum pump to manifold 13 will be cut off and the vacuum in the nozzles 12 destroyed to release the bottles on to the receiving conveyor 49. The descent of column g will cause the fixed striker $n^2$ to operate pilot valve $p^2$ when compressed air from distributor 41 will reverse lift valve 36 and permit reversal of movement of column g. As the latter rises striker n' will operate pilot valve p' to cause reversal of traversing valve 48, and compressed air from distributor 41 will operate to return traversing arm y to its position in which lifting head 2 is over the crate conveyor 16, thus completing its cycle of movements.

The reversing valves comprising clamp valve 23, lift valve 36, bottle grip valve 43 and traverse valve 48 as shown have a spring controlled air operated trigger 50, but may be of any other suitable form.

The stop $g^7$ and pilot valves p, p' and $p^2$ are adjustable along the supporting posts o, o' to suit the amount of lift to be given to the column g and thus the lifting head 2, and in this respect it is to be appreciated that the vertical movement of lifting head 2 when it is over the receiving conveyor 49 may be shortened with respect to its movement when over the crate conveyor by suitably positioning valve $p^2$ on post o'.

In the example described above a great part of the operational elements of the machine are contained in a casing of box-like form providing a base 80 for the machine from which projects vertically upwards at one corner of the base a columnar portion 81 enclosing primarily the lifting column g and air cylinder i. The lifting column g reciprocates through a packed flange portion of a cover 82 for the top of column 81. This positional arrangement of column 81 to one side of base 80 permits the crate conveyor 16 to pass over the base such that a crate when brought into position can operate members 18 and 33 and thus initiate and control the cycle of operations of the machine. Such cycle of operations is automatic when once initiated and no operation can normally take place in the absence of a crate. For testing and adjustment purposes, however, a handle 51 is provided upon the arm carrying the crate operated member 18.

When the bottle transferring machine is used for transferring filled bottles from a conveyor to a crate, means are provided for varying the spacing of the bars 11 carrying the nozzles 12 so that the lifting head will accept a series of bottles which are in close-up formation in rows transverse to the bars 11, and space the bottles in such rows in order to conform to the spacing in the crate. A lifting head for such a purpose is illustrated in Figures 9 and 10. Such a head is shown designed for carrying a complement of thirty bottles instead of twenty as previously described with lifting head 2, otherwise it is similar in certain respects, having side plates 10 for supporting a series of nozzle carrying bars 11 which in this form of head are five in number. Each end of the two outer bars are connected to a piston and cylinder unit 52 arranged in the compressed air operating circuit to be described later with reference to Figure 13. The two outer bars 11 are free to slide in slots 53 provided in plates 54 which can themselves slide on the side plates 10, whilst the two inner bars adjacent the outer bars are carried in and move with the plates 54. Slots 55 in side plates 10 accommodate sliding movement therein of both said outer bars and the adjacent inner bars. The centre bar of the bars 11 is fixed in the side plates 10 and therefore receives no movement. When adjusting the spacing of nozzles 12 compressed air applied to the pistons of cylinders 52 will first move inwardly the outer bars 11 until they reach the inner edges of slots 53 in sliding plates 54. The latter will then slide along side plates 10 carrying with them the two inner bars 11 until the latter contact the inner edges of slots 55 when all the bars and thus the nozzles 12 carried by them will be spaced to suit the spacing of bottles to be picked up as will be explained later with respect to Figure 13.

The lifting head illustrated in Figures 9 and 10 has a manifold 13 with nipples 14 similarly as previously described, but in the present arrangement there are six groups of nipples spaced along the manifold with five nipples in each group. Each nipple 14 is connected to a bottle gripping nozzle 12 but, as previously referred to, the latter will now be described with reference to Figure 11 as being of the compressed air operated type.

Figure 11 shows in detail the bottle gripping nozzle depending from a bar 11, the latter as shown having a bush 56 passing through and secured to it. Mounted for sliding movement within the bush is a stem 57 which has secured to it at its lower end an inverted cup-shaped member 58 forming a cylinder for a piston element 59. Screwed within the open end of cylinder 58 is a nose member 60 which is bell-mouthed or flared in order to locate and guide the tops of the bottles into the interior of the nozzle. Received within the end of piston 59 and located between the latter and the nose 60 is a gripper member 61 which is formed of rubber or other suitable resilient material and has circumferential grooves around its exterior in order to increase its flexibility. A compressed air inlet connection is provided at 62 for supplying compressed air to the chamber in cylinder 58 above the piston 59. The latter, which has a sealing cup-washer element 63 is carried from a stem 64, extending within a bore in the lower portion of stem 57, and being spring loaded by spring 65 for supporting piston 59 in the top portion of cylinder 58. In order to minimise jamming of bottles during operation of the machine the stem 57 is spring loaded by a spring 66 located between the base of a bore in stem 57 and cap 67 screwed upon the bush 56. Air is supplied and exhausted in correct sequence through inlet 62 by means of the air manifold 13 carried by head 2, the manifold being connected to the compressed air supply circuit and supplied with air in a manner to be explained later in connection with Figure 13. When compressed air is passed through the air inlet 19 of a nozzle 12 the piston 59 will be forced downwards against the pull of spring 65, and the resilient gripper 61 thus being compressed will bulge inwardly around the neck of a bottle somewhat as indicated in chain lines in Figure 11 and secure the bottle for lifting and transfer.

Referring now to the compressed air operating circuit diagram of Figure 13 for a recrating machine, such a machine is similar in all respects to the decrating machine already described, but in addition there is provided in the operating circuit a pilot valve 68 and spacer valve 69 for controlling the operation of the expanding type of bottle lifting head of Figures 9 and 10. The positions of such valves in the machine are indicated in Figure 8. In Figure 13 it is also to be noted that valve 44 has a connection 70 to lift valve 36 and a connection 71 for coupling the valves to inlet 72 of the lifting head manifold 13 (Figures 9 and 10).

With the above noted particular alterations the operation of a recrating machine will now be described, assuming first that the arm y is in a position such that the bottle lifting head 2 is above a filled and capped bottle supplying conveyor on which the bottles are marshalled in spaced rows in one direction and in close up or touching formation in a direction transverse to the spaced rows. Any suitable means may be adopted for arranging the bottles in this formation, such for example as the marshalling means described in our aforementioned British patent application No. 6,942/54.

The filled and capped bottle supplying conveyor will occupy a position with respect to the recrating machine similar to that of the receiving conveyor 49 of the decrating machine, and in the above assumed position of arm y the cam s will strike pilot valve t to permit compressed air to pass to pilot valve 22. When an empty crate operates trip plate 18 the subsequent clamping of the crate and the descent of lifting column g follows in a manner as described with reference to the decrating machine. As column g descends a striker 70 mounted in a suitable position on flange $g^4$ of the column will operate pilot valve 68 mounted on supporting post o' and compressed air from distributor 41 will operate spacer valve 69 to permit compressed air to pass to the two cylinders 52 on the lifting head 2. Movements of the pistons in cylinders 52 will act to draw in the bars 11 on the head to position nozzles 12 for picking up the filled bottles on the supplying conveyor. On continued movement of column g its flange $g^4$ will contact stop $g^7$ and a building up of pressure will take place to open valve 47 in a manner as previously described. Opening of valve 47 will result in operation of valve 42 and opening of valve 44 for the passing of compressed air to the nozzles 12 which will by then have passed over the bottle necks, and the resilient members 61 in the nozzles will thus be compressed to grip the bottles. Also resulting from the opening of valve 47 is the reversal of valve 36 and the rising of column g together with arm y and the head 2 gripping the bottles. As column g rises a striker 71 suitably positioned on flange $g^3$ of the column will operate pilot valve 72 on supporting post o' resulting in the operation of traversing valve 48 for traversing arm y to a position over the clamped empty crate on crate conveyor 16. Operation of pilot valve 72 will also operate through valve 23 the spacer valve 69 to permit compressed air again to pass to the cylinders 52 on the lifting head 2, and the bars 11 will thus be separated to space the nozzles 12 with the bottles to suit the bottle spaces in the crate.

As traversing arm y reaches the end of its movement cam s will operate pilot valve t resulting in column g being lowered to a position in which a striker 73 mounted on flange $g^4$ of the column will operate pilot valve 74 on supporting post o. Operation of valve 74 will result in the reversal of lift valve 36 which causes the closing of valve 44 and thus the release of the bottles from the nozzles 12 into the crate. Also reversal of valve 36 causes the rising of column g until striker 75 on flange $g^3$ of the column operates pilot valve 76 on supporting post o, when traversing valve 48 will be reversed to cause arm y to return to a position over the filled and capped bottle supplying conveyor ready for the operation of a further cycle of operations.

Instead of air operation, other pressure fluid operation may be used, or operation by suitable lever and cam means may be provided.

Moreover where reference has been made to "crate" it is to be understood that such is not restricted to crates used in connection with milk bottling as the invention may be applied to cases or containers e.g. for packaging small cans.

We claim:

1. Apparatus for handling bottles or other containers comprising bottle transfer means which is vertically reciprocable and also oscillatable about a vertical axis in order to transport the bottles between bottle pick-up and discharge positions, a pressure fluid circuit comprising pressure fluid operated crate clamping means and pressure fluid operated means for vertically reciprocating the bottle transfer means, said bottle transfer means having a sleeve member mounted for oscillatory movements about a vertical axis, a lifting column surrounding said sleeve member and mounted for vertical reciprocatory movements independently of said sleeve member, means operatively connecting the lifting column with the sleeve member to give to the former the oscillatory movements of the latter, a transfer arm secured to the lifting column, a lifting head secured to said arm, and means upon said head for gripping the bottles or containers, a pressure fluid operated unit in said pressure fluid circuit for lowering and raising the lifting column comprising a cylinder carried by the oscillating sleeve and a piston secured by its rod to the lifting column, and a control valve in said pressure fluid circuit operable by the crate as it is clamped to release pressure fluid for operating said pressure fluid operated unit.

2. Apparatus as claimed in claim 1, having a pressure fluid operated unit for oscillating the sleeve member comprising a cylinder secured at one end by a pivotal mounting and a piston secured by its rod to an arm radiating from the oscillatory sleeve, valve operating means carried by the lifting column, and a control valve operated by said valve operating means on the raising of the lifting column to release pressure fluid for operating said pressure fluid operated unit.

3. Apparatus for handling bottles or other containers comprising bottle transfer means which is vertically reciprocable and also oscillatable about a vertical axis in order to transport the bottles between bottle pick-up and discharge positions, a pressure fluid circuit comprising pressure fluid operated crate clamping means and pressure fluid operated means for vertically reciprocating the bottle transfer means, said bottle transfer means having a sleeve member mounted for oscillatory movements about a vertical axis, a lifting column surrounding said sleeve member and mounted for vertical reciprocatory movements independently of said sleeve member, a transfer arm secured to the lifting column, a lifting head secured to said arm, means upon said head for gripping the bottles or containers, a driving member secured to the oscillatory sleeve member, a shaft member secured to the lifting column and passing through the driving member, and means operatively connecting said shaft member to the driving member such that it can move axially through the latter and also transmit the oscillatory movements of the sleeve member to the lifting column.

4. Apparatus as claimed in claim 3, having the driving member in the form of a driving sleeve secured to the upper end of the oscillatory sleeve member, the shaft member secured to and depending from the upper end of the lifting column and passing through the driving sleeve, said shaft member being keyed to the driving sleeve such that it can move axially through the latter and also transmit the oscillatory movements of the sleeve member to the lifting column.

5. Apparatus as claimed in claim 4, having a base plate, a bearing column carried at its foot by the base plate, a bore at the upper end of the bearing column to receive the shaft member, the oscillatory sleeve member surrounding and supported by the bearing column, and a thrust bearing carried by the base plate around the foot of the bearing column to take the weight of the oscillatory sleeve member.

References Cited in the file of this patent

UNITED STATES PATENTS

| | | |
|---|---|---|
| 2,119,725 | Stecher | June 7, 1938 |
| 2,253,283 | Minaker | Aug. 19, 1941 |
| 2,528,985 | Wunsch | Nov. 7, 1950 |
| 2,628,732 | Griswold | Feb. 17, 1953 |
| 2,631,746 | Holstebro et al. | Mar. 17, 1953 |
| 2,666,562 | Birch | Jan. 19, 1954 |
| 2,707,571 | Smith | May 3, 1955 |